United States Patent [19]
Naramura

[11] Patent Number: 5,549,040
[45] Date of Patent: Aug. 27, 1996

[54] FOOD MATERIAL HEATING MECHANISM

[75] Inventor: Michiyuki Naramura, Okayama-ken, Japan

[73] Assignee: Kabushiki Kaisha Kyowa Kogyosho, Okayama-ken, Japan

[21] Appl. No.: 432,833

[22] Filed: May 2, 1995

[30] Foreign Application Priority Data

May 23, 1994 [JP] Japan ..................... 6-108379

[51] Int. Cl.[6] .................... A47J 37/06
[52] U.S. Cl. ............... 099/349; 099/369; 099/371; 099/374; 099/377
[58] Field of Search ................ 99/349, 369, 371, 99/374, 377, 379, 367, 378, 432, 447, 448; 219/445, 457, 479

[56] References Cited

U.S. PATENT DOCUMENTS

| | | | |
|---|---|---|---|
| 1,814,942 | 7/1931 | Mabey | 99/374 |
| 1,827,902 | 10/1931 | Offenhauser | 99/379 |
| 1,859,004 | 5/1932 | Reich | 99/379 |
| 2,108,778 | 2/1938 | Morgan | 99/374 |
| 2,300,644 | 11/1942 | Boyd | 99/374 |
| 2,834,334 | 5/1958 | Bill | 99/443 R |
| 3,998,145 | 12/1976 | Maisch | 99/376 |
| 4,163,418 | 8/1979 | Thelander | 99/374 |
| 4,164,591 | 8/1979 | Ahlgren et al. | 99/386 |
| 4,364,308 | 12/1982 | John et al. | 99/369 |
| 4,700,619 | 10/1987 | Scanlon | 99/374 |
| 4,987,827 | 1/1991 | Marquez | 99/379 |

*Primary Examiner*—David Scherbel
*Assistant Examiner*—James F. Hook
*Attorney, Agent, or Firm*—Christopher R. Pastel; Thomas R. Morrison

[57] ABSTRACT

A food material heating mechanism includes at least an upper and a lower heating plate. Food material is placed on a food material tray which is then placed on the lower heating plate. The upper and lower heating plates are moved toward each other to cause an upper surface of the food material to make contact with a bottom surface of the upper heating plate for a heating process. Heating is enhanced by adding a layer of a far infrared radiation substance to surfaces of the heating plates and food material tray which make contact with the food material. The food material tray is preheated to a temperature that is substantially lower than a temperature of the upper heating plate, whereby during the heating process, a soft surface is produced by contact of the food material with the food material tray, and a crusty surface is produced by contact with the upper heating plate. A fluororesin, such as TEFLON, can be added to the surfaces which come into contact with the food material to prevent sticking. An example embodiment is described for heating crowns and heels of hamburger buns.

13 Claims, 8 Drawing Sheets

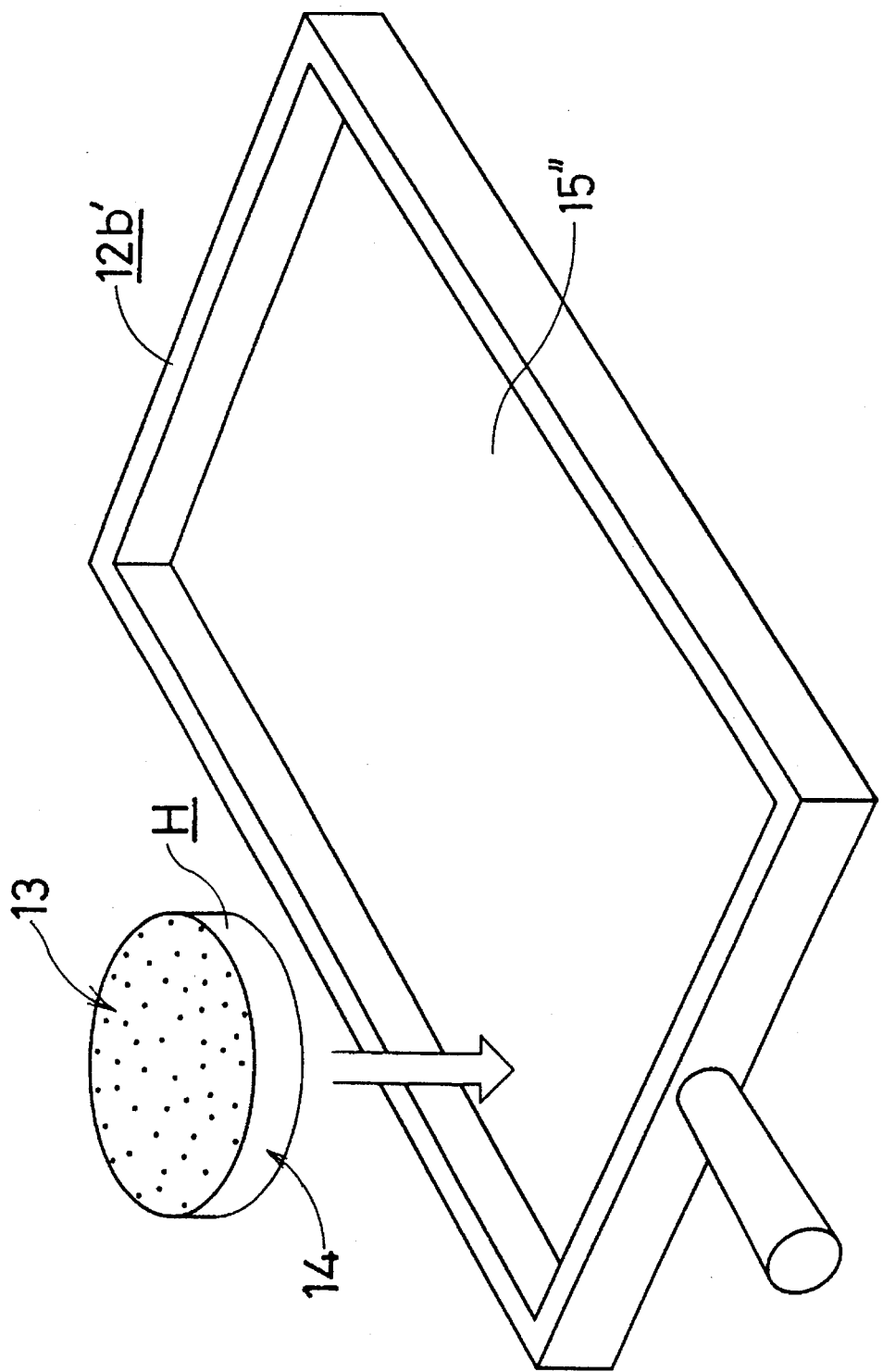

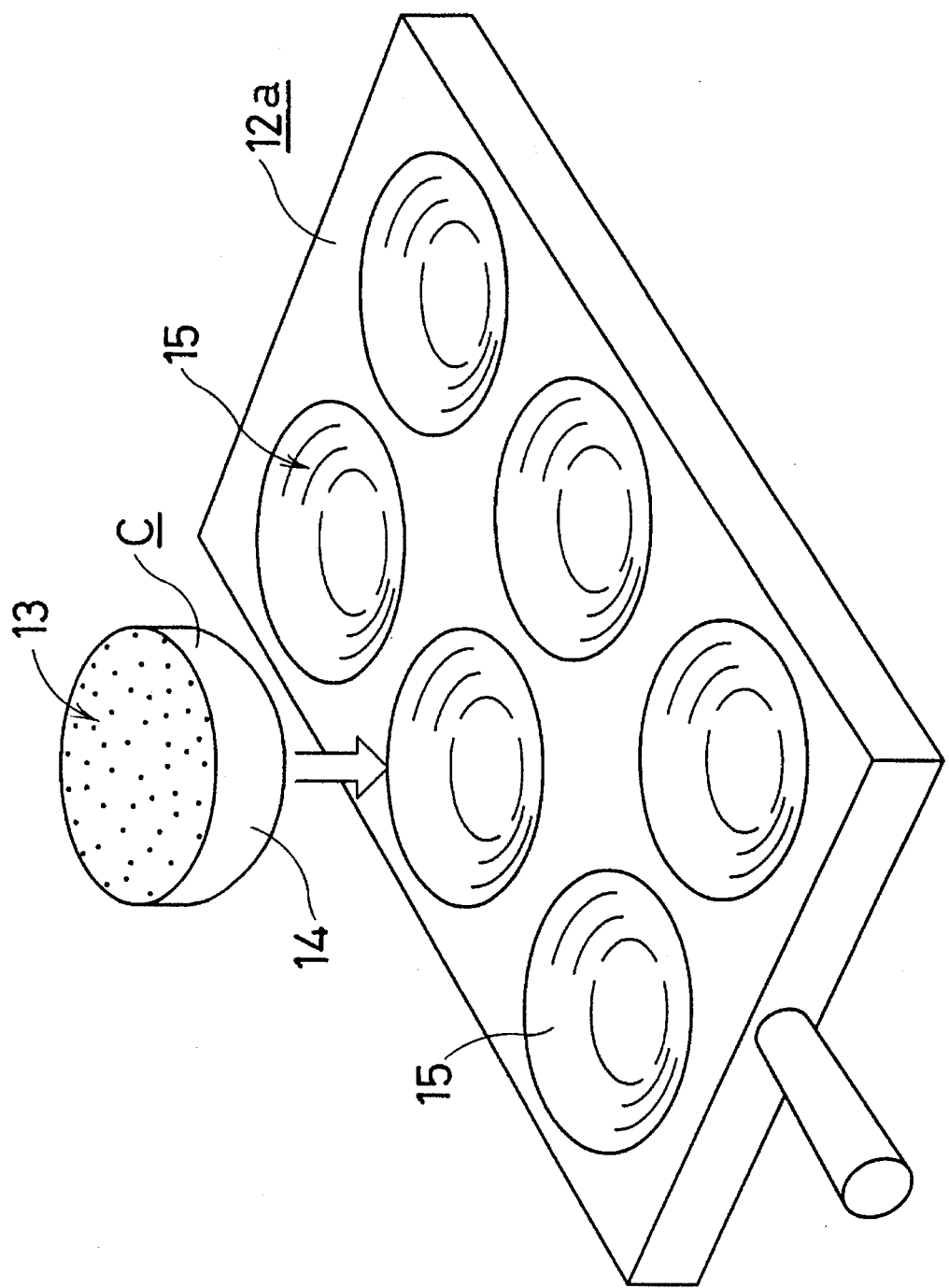

FOOD MATERIAL HEATING MECHANISM

BACKGROUND

The present invention relates to a food material heating mechanism for heating food materials such as hamburger buns. Fast-food restaurants sell various types of hamburgers and sandwiches preparing them according to the orders of customers. In order to prepare ordered items quickly and sell them on the spot, buns are generally heated as follows.

A bun is cut into two portions; a lower portion (hereinafter referred to as a "heel" and an upper portion (hereinafter referred to as a "crown"). A heating plate, which applies heat to heels and crowns, comes into contact with a cut surface of a heel or a crown and heats it for a specific time to raise the inside temperature to about 80° C. At this stage, the temperature of the heating plate is set relatively high (about 230° C.), so that a crusty baked layer forms on the cut surface. This crusty layer adds to the flavor, prevents sauces added to the surface from soaking into the heel or crown, and keeps the heated heel or crown crisp.

In general, it takes longer to heat the inside of a heel or crown than it does to obtain a crusty layer on the cut surface. By the time the inside is fully heated, the cut surface is overcooked by the heating plate. This can cause the cut surface to become burned or too dry with a resulting deterioration in taste. This is a problem in the food preparation industry.

OBJECTS AND SUMMARY OF THE INVENTION

It is therefore an object of the present invention to provide a food material heater capable of forming a crusty baked layer on a surface of a food material without burning, while at the same time heating the inside to a desired temperature.

It is a further object of the present invention to provide a food material heating mechanism that heats food material quickly and efficiently.

Briefly stated, a food material heating mechanism includes at least an upper and a lower heating plate. Food material is placed on a food material tray which is then placed on the lower heating plate. The upper and lower heating plates are moved toward each other to cause an upper surface of the food material to make contact with a bottom surface of the upper heating plate for a heating process. Heating is enhanced by adding a layer of a far infrared radiation substance to surfaces of the heating plates and food material tray which make contact with the food material. The food material tray is preheated to a temperature that is substantially lower than a temperature of the upper heating plate, whereby during the heating process, a soft surface is produced by contact of the food material with the food material tray, and a crusty surface is produced by contact with the upper heating plate. A fluororesin, such as TEFLON, can be added to the surfaces which come into contact with the food material to prevent sticking. An example embodiment is described for heating crowns and heels of hamburger buns.

According to an embodiment of the present invention, a food material heating mechanism includes an upper heating plate, a lower heating plate facing the upper heating plate, means for permitting placing a food material tray on the lower heating plate, the food material tray including means for receiving a food material to be heated, the means for receiving including a contour into which the food material is fittable, the contour having a depth, the depth being a predetermined amount less than a height of the food material, and means for moving one of the lower heating plate and the upper heating plate toward the other thereof whereby an upper surface of the food material contacts a bottom surface of the upper heating plate.

According to a feature of the invention, the food material tray is shaped to contact a lower surface of the upper heating plate so that the food material between the food material tray and the upper heating plate is isolated from open air during a time of pressing and heating the food material.

According to another feature of the invention, the food material heating mechanism has a layer which includes a far infrared radiation substance on a food material receiving surface of the food material tray, the upper heating plate, or the lower heating plate, or on any combination thereof. The layer may also include a non-stick substance such as a fluororesin.

According to another embodiment of the invention, a food material heating mechanism includes a plurality of heating plates disposed vertically substantially parallel to one another, means for permitting insertion of at least one food material tray into the heating mechanism whereby the food material tray rests on a first one of the heating plates with a second one of the heating plates disposed adjacent and above, the food material tray including means for receiving a food material to be heated, and means for moving one of said second one of said heating plates and said first one c f said heating plates toward the other thereof, whereby an upper surface of said food material contacts a bottom surface of said second one of said heating plates.

In order to achieve these objects, the present invention provides a food heater that includes at least one pair of upper and lower heating plates and a food material tray which is placed on the lower heating plate. The food material tray receives food material positioned with a side on which a baked layer is desired facing upward. The food material is pressed and heated between the food material tray and the upper heating plate.

This heater may include several heating plates disposed horizontally, capable of moving closer together and further apart. The food material trays, on which food materials are received, are inserted in the space between the heating plates on top of a heating plate except for the uppermost heating plate. The upper surface of the uppermost heating plate, since it does not upwardly face a paired heating plate, is not used in this sense, because heating of both sides of the food materials is not possible in this location. The food materials are pressed and heated between the upper surface of the food material trays and the heating plates located just above them.

A food material tray may isolate the food material between the tray and the heating plate above it to keep it from open air at the time of pressing and heating the food material.

A food material tray may optionally include a depression shaped to correspond with the contour of food material to be received.

Furthermore, a layer of far infrared radiation substance is provided on the food receiving surface of the food material tray and/or at least one surface of the heating plates which makes contact with the food material.

The present invention constituted as above has the following advantages.

In the food heater of the present invention, the food tray receives food with the side upon which a crusty baked layer is desired facing upward. The food material tray is placed on the lower heating plate of a pair of upper and lower heating plates. The food material is pressed and heated between the food material tray and the upper heating plate. Heat from the lower heating plate is conducted indirectly to the food material through the food material tray, so that heat transfer therefrom to the food material is less than that from the upper heating plate. The food material is heated from above and below. The upper side of the food material, on which a crusty baked layer is desired, is heated in direct contact with the upper heating plate, while the bottom side of the food material is heated through the food material tray with a smaller amount of heat. The entire tray with the food material can easily be removed after the completion of heating. In addition, fully heated food material is kept warm and fresh by remaining in the heated tray until used as part of a sandwich.

In the heater of the present invention, at least three heating plates are disposed vertically and capable of moving vertically closer together and further apart. A food material tray is inserted between each facing pair of heating plates. The number of food material trays that can be accommodated is thus one less than the number of heating plates. Food materials on the trays are pressed and heated between the trays below them and the heating plates located just above them. The food materials are heated in the same way as described above. In addition, a lot of food material can be simultaneously heated on the food material trays. Heat from the top sides of the heating plates is applied to the food material through the food material trays disposed on the heating plates. Heat from the bottom sides of the heating plates affects the food material located beneath and in direct contact with the upper surfaces of the food material on which crusty baked layers are desired.

Forming the upper side of the food material tray and the lower side of the heating plate above it such that a substantial isolation of air is achieved when these elements are moved together during the pressing and heating process facilitates air tightness and thermal efficiency.

Furthermore, providing the food material tray with a shaped depression corresponding with the contour of the food material to be heated, besides improving sealing to exclude external air, also enhances the efficiency of conducting heat to the food material. This shape may also avoid excessive pressure against the food material during the pressing and baking process, so that the food material retains its original shape.

Adding a layer of far infrared radiation substance on the surface of the food material tray and the heating plates improves heat transfer from the tray and heating plates to the food material. This is due to conversion of more of the heat energy to far infrared rays emitted from the far infrared radiation substance. Far infrared rays tend to penetrate deeply into food, as compared to shorter wavelengths (near infrared). As a result, the interior of the food material may be heated in a shorter time without the overbaking the exterior.

BRIEF DESCRIPTION OF THE DRAWINGS

FIG. 7 is a perspective view of another embodiment of a food material tray for receiving heels in the food heater of FIG. 1.

FIG. 8 is a perspective view of a food tray for receiving crowns in the food heater of FIG. 1.

DETAILED DESCRIPTION OF THE PREFERRED EMBODIMENT

Figure 1:
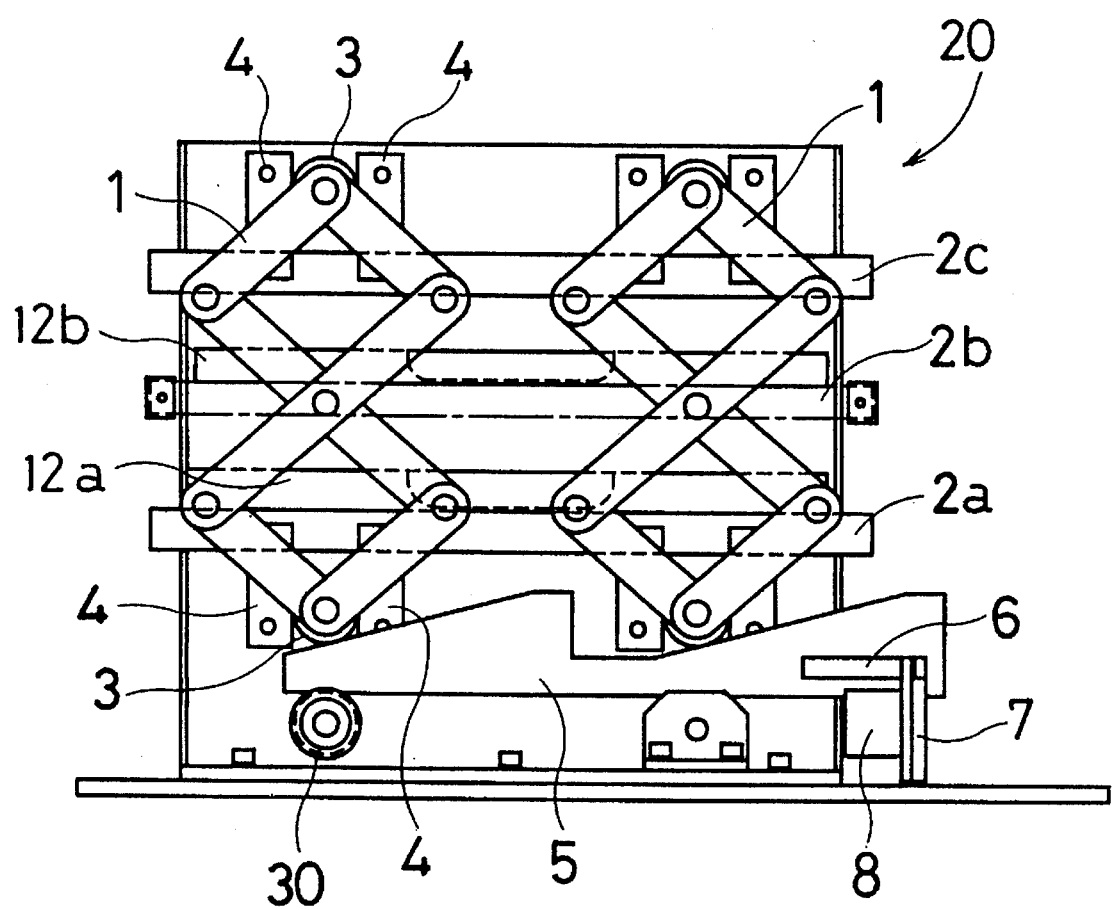
FIG. 1 is a front elevation view of an embodiment of the food heater of the present invention.
Figure 2:
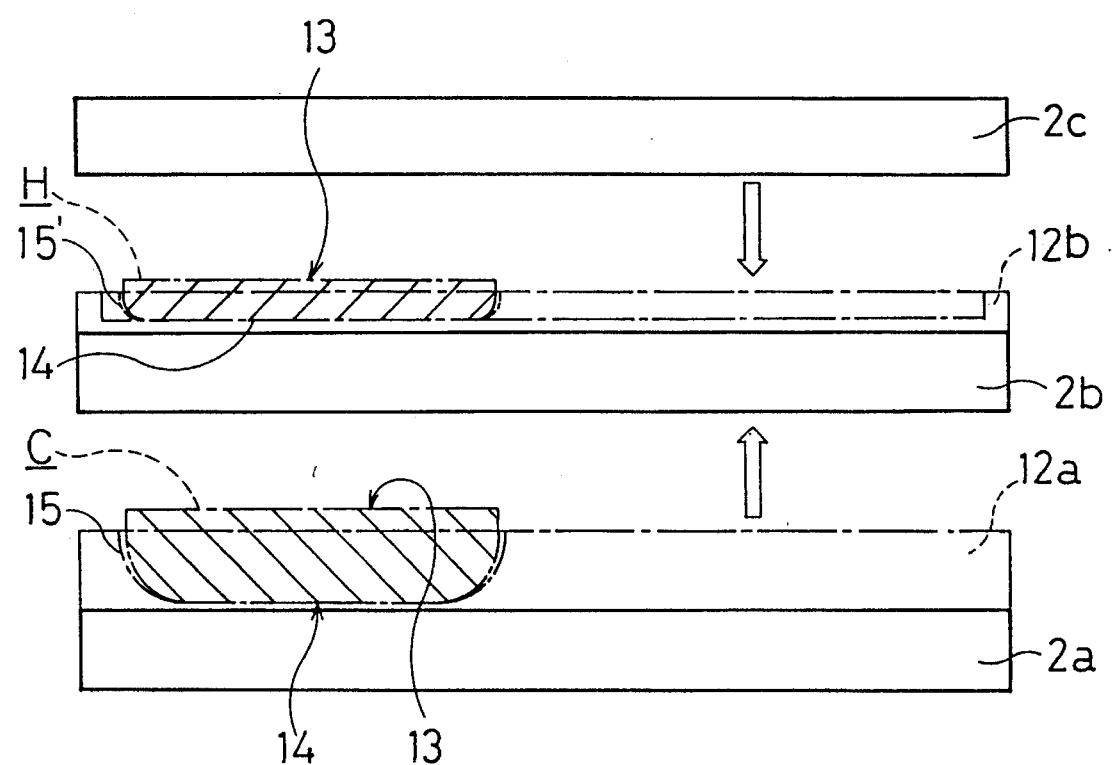
FIG. 2 is a fragmentary front elevation view of two food material trays and three heating plates of the food heater of FIG. 1.

Referring to FIGS. 1 and 2, a food heater 20 heats and bakes heels H and crowns C simultaneously. Food heater 20 has three heating plates: a lower heating plate 2a, a middle heating plate 2b, and an upper heating plate 2c. Upper heating plate 2c and lower heating plate 2a are movable upward and downward by action of pantograph 1. Middle heating plate 2bis fixed in place. Link expansion rollers 3 of each pantograph 1 are aligned vertically and move together and apart, thus moving lower heating plate 2aand upper heating plate 2c together and apart.

Figure 3:
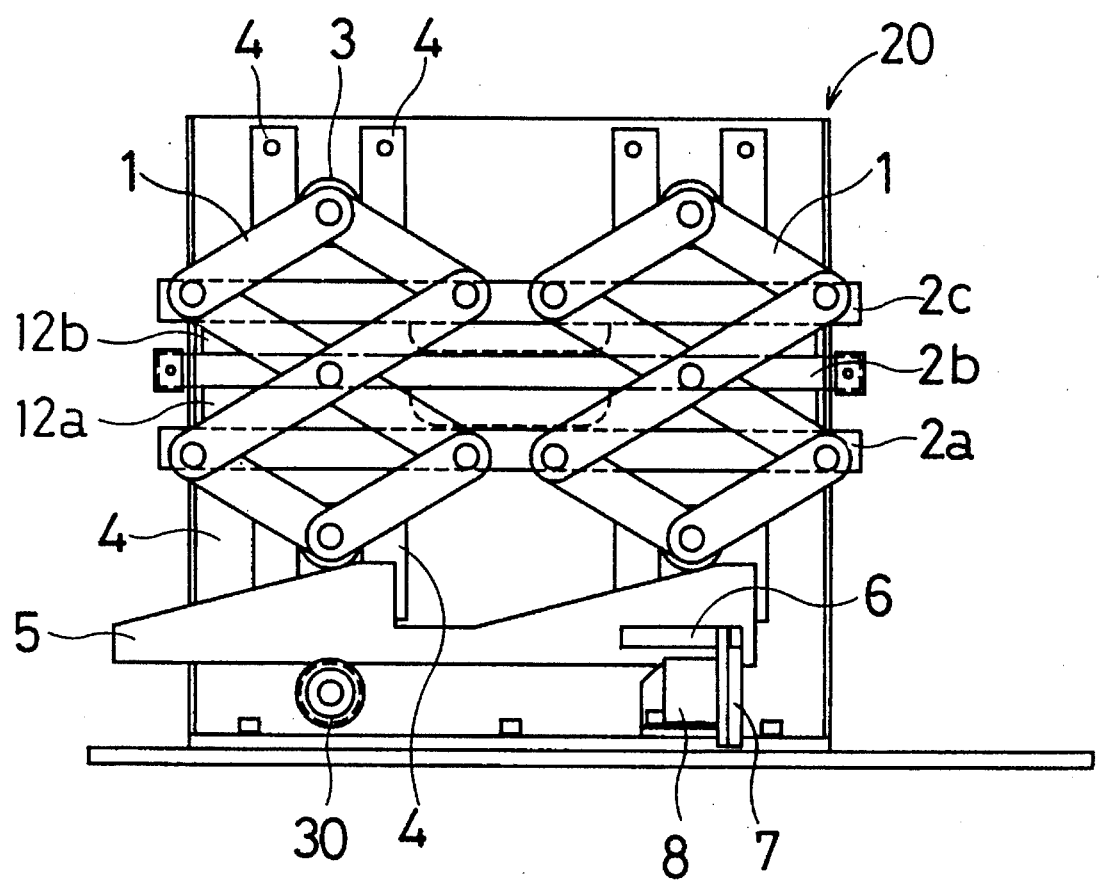
FIG. 3 is a front elevation view of the food heater of FIG. 1 showing a heating operation.
Figure 5:
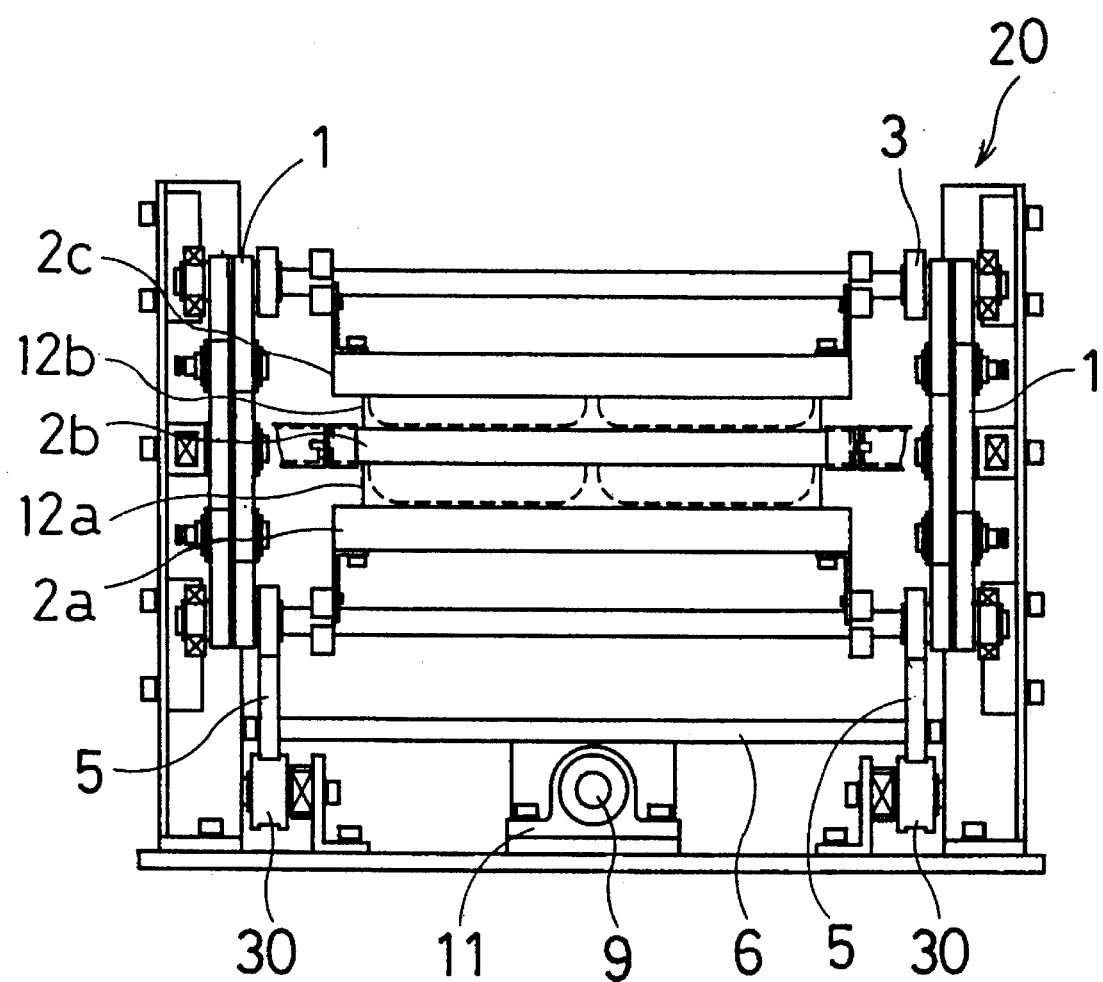
FIG. 5 is a side elevation view of the food heater of FIG. 3.
Figure 6:
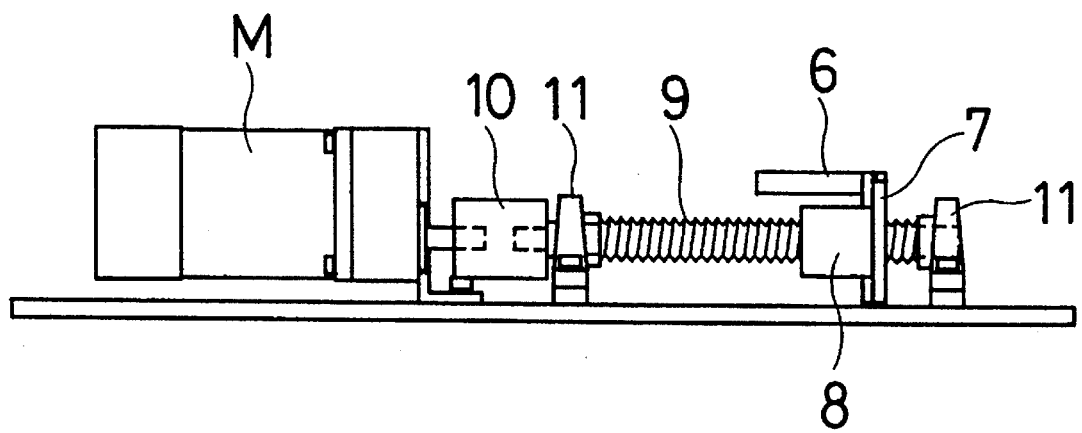
FIG. 6 is a front elevation view of a rotary driving unit of the food heater of FIG. 1.

A plurality of guides 4 confine the moving track of link expansion rollers 3 vertically within a specific range, thus preventing horizontal motion. At the lower ends of pantographs 1, an arm 5 with an upper surface that slopes in two separate areas engages link expansion rollers 3. Arm 5 moves horizontally and is supported by an arm roller 30. As arm 5 moves horizontally, its upper surfaces act as cams against the lower link expansion rollers. Pantograph 1 thus remains stationary, or moves up and down in response to the horizontal movement of arm 5. Pantograph 1 compresses as the link expansion rollers 3 roll on the upwardly sloping surface of arm 5. The lower ends of pantographs 1 rise, and upper heating plate 2c and lower heating plate 2a move toward middle heating plate 2b. A food material tray 12a is on lower heating plate 2a, and a food material tray 12b is on middle heating plate 2b. Thus, as arm 5 moves horizontally to the left as seen in FIG. 1, pantographs 1 compress, bringing a bottom surface of upper heating plate 2c into contact with an upper surface of food material tray 12b. At the same time, an upper surface of food material tray 12a moves into contact with a bottom surface of middle heating plate 2b. The full contact position for heating is shown in FIGS. 3 and 5.

As shown in this embodiment, food material tray 12a receives crowns C and food material tray 12b receives heels H. Food material trays 12a and 12b are made of any heat conductive material such as, for example, ceramic or metal. Food material trays 12a and 12b depicted in FIG. 2 are preferably made of aluminum.

Food material trays 12a and 12b receive heels H and crowns C with their cut surfaces 13, on which a crusty baked layer is desired, facing upwards. Each cut surface 13 comes into contact with its upwardly adjacent heating plate 2b and 2c during the heating process to form the crusty baked layer. Lower crust sides 14 of each heel H and crown C contact food material trays 12a and 12b respectively.

Figure 4:
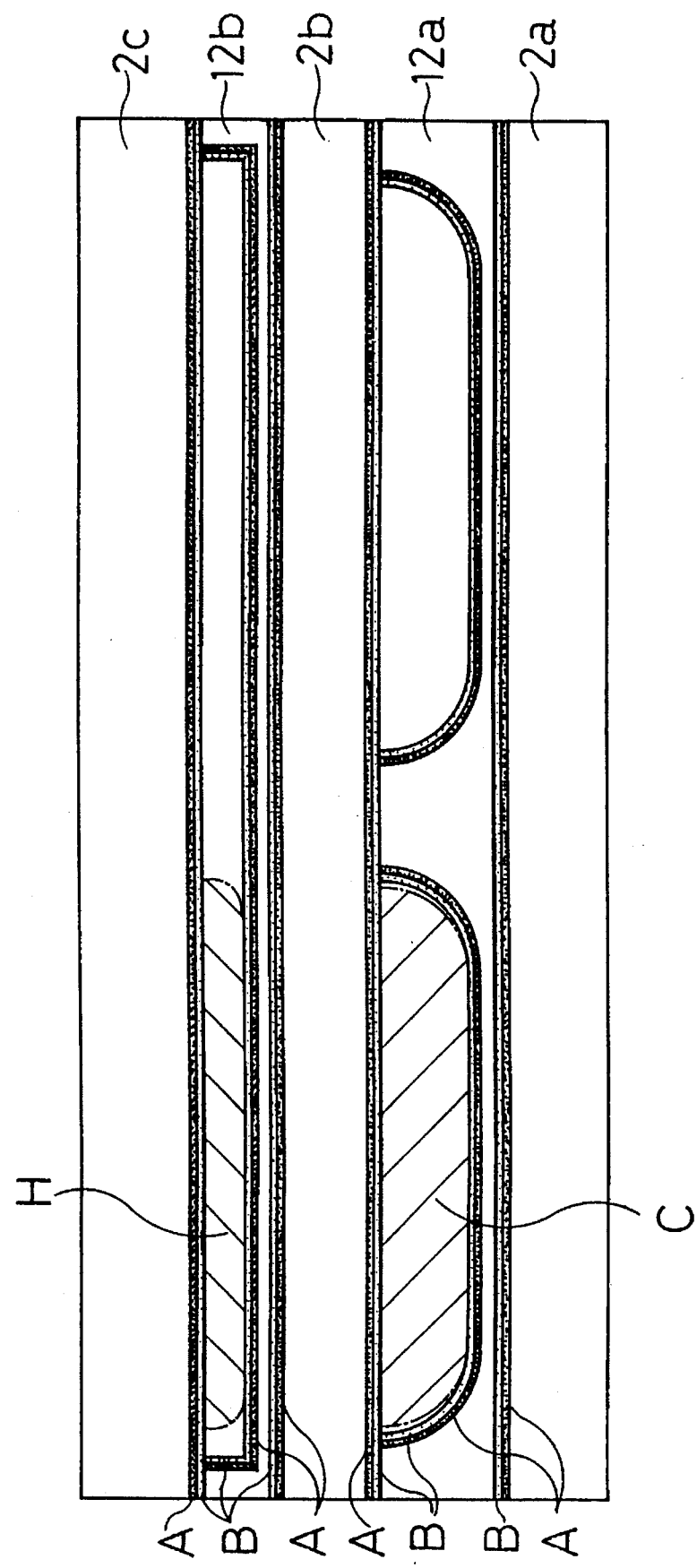
FIG. 4 is a fragmentary front view of two food material trays and three heating plates of the food heater of FIG. 3.

Referring now to FIGS. 2 and 4, food material tray 12a has a plurality of depressions 15 shaped to match a contour of crown C. Food material tray 12b has a plurality of depressions 15' shaped to match a contour of heel H. The depth of depressions 15 are approximately 2 mm to 3 mm thinner than the average thickness of crowns C. Depressions 15' likewise are approximately 2 mm to 3 mm thinner than the average thickness of heel H. A slight vertical compressive force is thus applied to heels H and crowns C by their respective heating plates while they are being heated and baked when the next adjacent heating plate is lowered into full contact with an upper surface of food material tray 12a or 12b. Food material in depressions 15 and 15' of food material trays 12a and 12b is isolated from the open air during the pressing and heating process.

Referring now to FIG. 7, an alternative embodiment for a food material tray 12b' for receiving heels H is shown. Instead of the plurality of depressions 15' shown in FIGS. 2 and 4, food material tray 12b' has a single depression 15" sized to accommodate a plurality of heels H. A similar food material tray 12a' (not shown) is shaped to accommodate a similar number of crowns C. The depth of depression 15" is approximately 2 mm to 3 mm thinner than the average thickness of heels H. A slight vertical compressive force is thus applied to heels H by upper heating plate 2c while heels H are being heated and baked. Food material tray 12b' isolates the food material in depression 15" from the open air during the pressing and heating process.

FIG. 8 shows an embodiment or food material tray 12a with six depressions 15. Crust side 14 of each crown C is fitted into a depression 15, with its cut surface 13 facing upward. The depth of depressions 15 are approximately 2 mm to 3 mm thinner than the average thickness of crowns C. When a slight vertical compressive force is applied to crowns C by its heating plate during the pressing and heating process, depressions 15 help crowns C retain their shape. Food material tray 12a isolates the food materials in depressions 15 from the open air during the pressing and heating process.

The embodiment as shown in FIG. 1 uses three heating plates and two trays, specifically for heating heels and crowns. However, the present invention may be realized with at least one pair of upper and lower heating plates, and a single food material tray. The single food material tray is placed on the lower heating plate. In such a food heater, either heels H or crowns C may be heated at any one time depending on the food material tray used. Either the two heating plates move towards each other, or only one plate moves. In other respects, this alternative embodiment operates similarly to the previous embodiment. In another embodiment, two heating plates may be used to accommodate both heels and crowns in one food material tray between them. This may be satisfied by giving the depressions different depths so that, when the plates are brought together, a uniform amount of compression of both kinds of food material is achieved.

Referring to FIGS. 1, 3, 5, and 6, the movement of arm 5 is controlled by a motor M. Motor M is connected to a screw shaft 9 through a coupling 10. Screw shaft 9 is supported on each end by pillow blocks 11. A screw nut 8 on screw shaft 9 is connected to a coupling bar 6 by a bracket 7. Coupling bar 6 is attached to arm 5. Screw nut 8 moves linearly in response to the rotation of screw shaft 9 by motor 10. The linear motion of screw nut 8 is connected to arm 5 by coupling bar 6. As a result, the rotary motion of the motor M is converted into the expansion and contraction of pantographs 1, thereby moving lower and upper heating plates 2a and 2c closer to or away from fixed middle heating plate 2b.

Referring to FIG. 4, a layer A of a far infrared radiation substance is provided by a known surface treatment on a food receiving surface of each of food material trays 12a and 12b, on the bottom side of upper heating plate 2c, on both the top and bottom sides of middle heating plate 2b, and on the top side of lower heating plate 2a. Respective layers A of far infrared radiation substance emit far infrared rays when heated. The far infrared region of the electromagnetic spectrum covers wavelengths from about 1,000 microns to about 25 microns. The far infrared ray emitted from the far infrared radiation substance penetrates into the interior of the food material to hasten the rise of the inner temperature of the food material. As a result, the entire food material is heated before the outside of the food material becomes overbaked or burned.

In addition, a thin film B of a non-stick, or abherent, substance such as, for example, a fluororesin, such as TEFLON or other polytetrafluoroethylene, is added onto layer A by a known method. This provides abherence against food materials to be heated and prevents the adhesion of the food material to the food material tray at the time of removal. The fluororesin can be combined with the far infrared radiation substance in a single layer.

Food materials are heated by the embodiment of the food material heating heater of the present invention as follows. The temperature of the respective heating surfaces of the upper, middle and lower heating plates 2c, 2b, and 2a is set and maintained at about 230° C. Food material trays 12a and 12b are kept inserted in a preheating slot (not shown) located in an upper portion of the heater and preheated to a temperature slightly below the 110° C. to 140° C. range. A temperature between about 110° C. to about 140° C. is preferable for heating a crust side of a bun. When food material trays 12a and 12b are shifted onto heating plates 2a and 2b, the temperature of food material trays 12a and 12b rise to the range of about 110° C. to about 140° C. Preheating food material trays 12a and 12b shortens the overall heating and baking time.

Preheated food material tray 12b receives six heels with cut surfaces 13 facing upward and preheated food material tray 12a receives six crowns also facing upward. At this point, heels H and crowns C sit in their respective trays with the cut side portions projecting by about 2 mm to 3 mm above food material trays 12a and 12b. Food material tray 12b with heels H is placed, for example, on middle heating plate 2b, and food material tray 12a with crowns C is placed on lower heating plate 2a. Motor M rotates to move upper and lower heating plates 2c and 2a toward middle heating plate 2b. In other words, upper heating plate 2c lowers to a prescribed position while lower heating plate 2a rises to a prescribed position. At this point in time, heels H and crowns C are pressed and heated between their supporting trays and the respective heating plates located directly above. When the plates come into a "pressing state", the heater starts heating the heels H and the crowns C. This state is maintained for a specified time to complete the heating of the heels H and crowns C simultaneously.

Cut surfaces 13 of heel H and crown C make direct contact with and are heated by upper heating plate 2c and middle heating plate 2b respectively, which are at a high temperature of about 230° C. Crust sides 14 of heel H and crown C, which are on food material trays 12b and 12a respectively, are heated by heat conducted from heating plates 2b and 2a respectively, through food material trays 12b and 12a. Crust sides 14 are therefore heated at the lower temperature of about 110° C. to 140° C. As a result, a crusty, baked layer is formed on cut surfaces 13 by the high temperature heating, while the crust sides 14 are heated with a lower temperature to remain soft.

In order to produce crusty baked layers on cut surfaces 13 of heels H and crowns C, it is necessary to heat them at a high temperature of about 230° C. Exposing the entire bun to this high temperature, however, causes crust sides 14 to overcook or burn. In this embodiment, however, cut surfaces 13 and crust sides 14 are heated at different temperatures, so that crust sides 14 are kept from being overbaked.

When the heels H and crowns C are finished baking, motor M rotates in a reverse direction. Upper heating plate 2c reverses its original direction and rises. Lower heating plate 2a reverses its original direction and moves downward. The space between upper, middle, and lower heating plates 2c, 2b, and 2a increases. Each food material tray 12a and 12b is then removed from its respective heating plate.

In this embodiment, it takes about 10 to 15 seconds to raise the temperature of the center parts of heels and crowns to about 80° C. By contrast, in a known heater, where heat is applied to heels and crowns via cut surfaces 13 only, it takes about one minute to heat the center parts of the heels and crowns to the desired temperature of about 80° C. Thus, this embodiment shortens the necessary heating time and enhances productivity.

Food material tray 12a for crowns C has depressions 15 shaped to match the contour of each crown C. This feature provides tray 12a with the benefits of efficiently conducting heat to crowns C, eliminating excessive pressure from a heating tray against crowns C, and retaining the original shapes of crowns C during the pressing and heating process. In order to form a crusty baked layer on cut surface 13 of crown C during the pressing and heating process, middle heating plate 2b is lowered to make contact with crown C and heat it while applying pressure. Since crowns C are in depressions 15 on food material tray 12a, crowns C keep their original shapes without being pressed flat during the heating process and thus retain their original appearance.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A food material heating mechanism, comprising:

an upper heating plate;

a lower heating plate facing said upper heating plate;

means for permitting placing a food material tray on said lower heating plate;

said food material tray including means for receiving a food material to be heated;

said means for receiving including a contour into which said food material is fittable;

said contour having a depth;

said depth being a predetermined amount less than a height of said food material;

means for moving at least one of said lower heating plate and said upper heating plate toward the other thereof whereby an upper surface of said food material contacts a bottom surface of said upper heating plate so that said food material is pressed and heated between said food material tray and said upper heating plate and heat from said upper heating plate directly affects an upper surface of said food material on which a crusty baked layer is desired; and said food material tray being heat conductive, whereby heat from said lower heating plate is conducted to said food material through said food material tray such that heat transfer from said food material tray to said food material is less than heat transfer from said upper heating plate to said food material.

2. A food material heating mechanism according to claim 1, further comprising:

a third heating plate aligned substantially parallel above said upper heating plate;

means for permitting placing a second food material tray between said upper heating plate and said third heating plate; and said means for moving including means for moving said upper and lower heating plates toward each other and for moving said upper heating plate and said third heating plate toward each other, whereby food material on said food material tray and said second food material tray are heated.

3. A food material heating mechanism according to claim 1, wherein said food material tray is shaped to contact a lower surface of said upper heating plate so that said food material between said food material tray and said upper heating plate is isolated from open air during a time of pressing and heating said food material.

4. A food material heating mechanism according to claim 1, further comprising:

a pantograph joining said upper and lower heating plates;

said means for moving including at least one cam surface;

at least one cam follower on said pantograph contacting said at least one cam surface; and means for moving said cam surface whereby said upper and lower heating plates are moved toward and away from each other in dependence on a position of said at least one cam surface.

5. A food material heating mechanism according to claim 1, further comprising a layer including a far infrared radiation substance on at least one of a food material receiving surface of said food material tray, said upper heating plate, and said lower heating plate.

6. A food material heating mechanism according to claim 5, wherein said layer further includes an abherent material.

7. A food material heating mechanism according to claim 6, wherein said abherent material includes a fluororesin.

8. A food material heating mechanism, comprising:

a plurality of heating plates disposed vertically in substantially rigid parallel relationship to one another;

means for permitting insertion of at least one food material tray into said heating mechanism whereby said food material tray rests on a first one of said heating plates with a second one of said heating plates disposed adjacent and above;

said food material tray including means for receiving a food material to be heated;

means for moving at least one of said second one of said heating plates and said first one of said heating plates toward the other thereof, whereby an upper surface of said food material contacts a bottom surface of said second one of said heating plates so that said food material is pressed and heated between said food material tray and said second one of said heating plates and heat from said second one of said heating plates directly affects an upper surface of said food material on which a crusty baked layer is desired; and said food material tray being heat conductive, whereby heat from said first one of said heating plates is conducted to said food material through said food material tray such that heat transfer from said food material tray to said food material is less than heat transfer from said second one of said heating plates to said food material.

9. A food material heating mechanism according to claim 8, wherein said food material tray is shaped to contact a lower surface of said second one of said heating plates so that said food material between said food material tray and said second one of said heating plates is isolated from open air during a time of pressing and heating said food material.

10. A food material heating mechanism according to claim 8, wherein said food material tray has at least one depression shaped according to a contour of said food material.

11. A food material heating mechanism according to claim 8, further comprising a layer including a far infrared radiation substance on at least one of a food material receiving surface of said food material tray, said first one of said heating plates, and said second one of said heating plates.

12. A food material heating mechanism according to claim 11, wherein said layer further includes an abherent material.

13. A food material heating mechanism according to claim 12, wherein said abherent material is a fluororesin.

* * * * *